(12) United States Patent
Elias (10) Patent No.: US 10,175,716 B2
(45) Date of Patent: Jan. 8, 2019

(54) TECHNOLOGIES FOR LOW-POWER AND HIGH-ACCURACY TIMESTAMPS

(71) Applicant: Intel Corporation, Santa Clara, CA (US)

(72) Inventor: Vinu K. Elias, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 141 days.

(21) Appl. No.: 15/280,282

(22) Filed: Sep. 29, 2016

(65) Prior Publication Data

US 2018/0088626 A1    Mar. 29, 2018

(51) Int. Cl.
*G06F 1/14* (2006.01)
(52) U.S. Cl.
CPC ...................... *G06F 1/14* (2013.01)
(58) Field of Classification Search
CPC ..... G06F 1/12; G06F 1/14; G06F 1/10; G06F 5/06; G06F 13/1689; G06F 1/08; G06F 1/04; G06F 1/3202; G06F 9/4825; G06F 11/0757; G06F 11/3419; G11C 7/22
See application file for complete search history.

(56) References Cited

U.S. PATENT DOCUMENTS

2006/0155941 A1 * 7/2006 Yamaguchi ............... G06F 8/60
711/154
2009/0080290 A1   3/2009 Ray et al.
2012/0100895 A1   4/2012 Priyantha et al.
2014/0115366 A1   4/2014 Joo et al.
2015/0067242 A1 * 3/2015 Kuroki ................. G06F 9/4406
711/103
2015/0346806 A1   12/2015 Dalal et al.

FOREIGN PATENT DOCUMENTS

WO    2014207612    12/2014

OTHER PUBLICATIONS

International search report for PCT application No. US2017047393, dated Nov. 30, 2017 (3 pages).
Written opinion for PCT application No. US2017047393, dated Nov. 30, 2017 (7 pages).

* cited by examiner

*Primary Examiner* — Zahid Choudhury
(74) *Attorney, Agent, or Firm* — Barnes & Thornburg LLP (57) ABSTRACT

Technologies for low-power and high-accuracy timestamps are disclosed. A compute device may have a sensor hub to capture sensor data with a corresponding timestamp. In order to save power, the sensor hub may be able to capture sensor data while the compute device is in a standby mode. However, the always running timer of the compute device may not be accessible to the sensor hub while the compute device is in the standby mode. The sensor hub may have a coarse-grained counter and/or fine-grained counter. To correct for any temporal drift, the compute device may determine an error between the always running timer and the coarse-grained and/or fine-grained counters when the compute device is out of the standby mode, and store an indication of the error in a location accessible by the sensor hub, even when the compute device is in the standby mode.

25 Claims, 5 Drawing Sheets

TECHNOLOGIES FOR LOW-POWER AND HIGH-ACCURACY TIMESTAMPS

BACKGROUND

Mobile computing devices, such as wearable computers, often capture sensor data periodically. In such devices, sensor data may be captured while a portion of the mobile computing device is in a standby mode. Depending on the application, the sensor data may need to be stored with a corresponding timestamp. A high-precision timer (such as a system clock) may be used to generate a timestamp for the capture of the sensor data.

In some cases, capturing a value of the high-precision timer to use as a timestamp may require that the mobile computing device exit the standby mode. Exiting the standby mode may require a relatively large amount of energy, and, therefore, capturing a timestamp may require a relatively large amount of energy.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C). Similarly, items listed in the form of "at least one of A, B, or C" can mean (A); (B); (C): (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
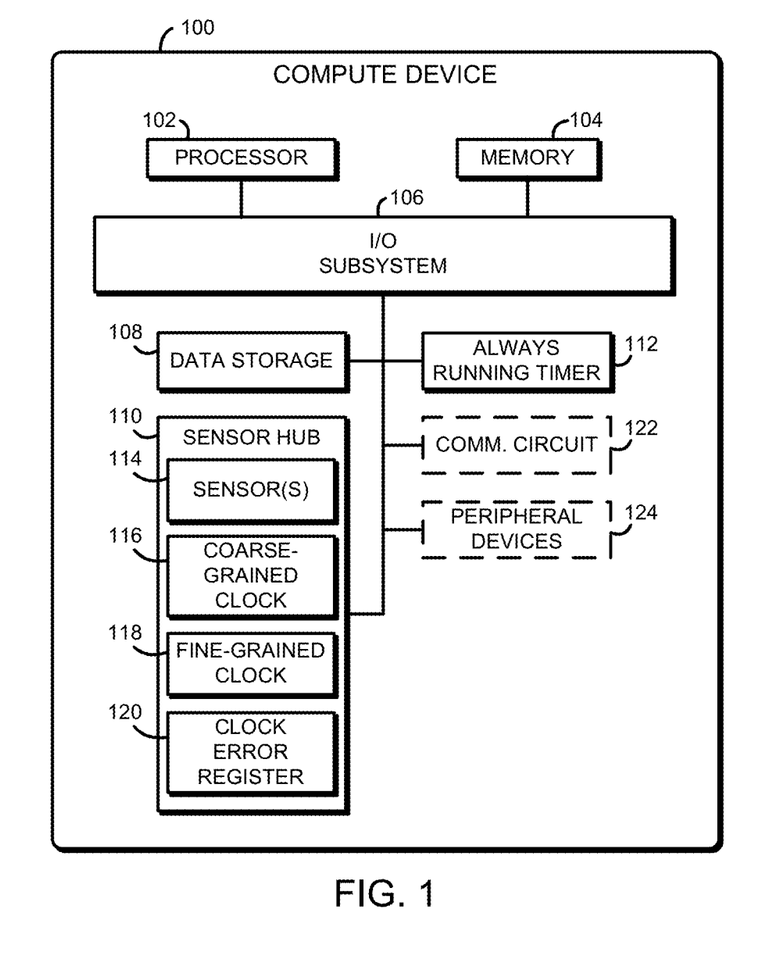
FIG. 1 is a simplified block diagram of at least one embodiment of a compute device for low-power capture of sensor values with high-accuracy timestamps.

Referring now to FIG. 1, an illustrative compute device 100 includes an always running timer (ART) 112 and a sensor hub 110, which includes one or more sensors 114, a coarse-grained clock 116, and a fine-grained clock 118. Because the coarse-grained clock 116 (and the fine-grained clock 118) is independent of the always running timer 112, the always running timer 112 may have a temporal drift relative to the coarse-grained clock 118 (and/or the fine-grained clock 118). In order to correct for the drift, the compute device 100 may determine the difference between the always running timer 112 and the coarse-grained clock 116 (and/or between the always running timer 112 and the fine-grained clock 118), and store an indication of the difference in a clock error register 120 of the sensor hub 110. In the illustrative embodiment, the sensor hub 110 may capture sensor data when the compute device 100 is in a low-power standby mode, and also capture a corresponding timestamp. In the standby mode, the compute device 100 may use the coarse-grained clock 116 and/or the fine-grained clock 118 for the timestamp, because the always running timer 112 may not be accessible in the standby mode. When the illustrative compute device 100 exits standby mode, the sensor hub 110 updates the clock error register 120 to correct for any drift.

The illustrative compute device 100 may be embodied as any type of compute device capable of performing the functions described herein. For example, the compute device 100 may be embodied as or otherwise be included in, without limitation, a wearable computer, an embedded computing system, a System-on-a-Chip (SoC), a smartphone, a cellular phone, a tablet computer, a notebook computer, a laptop computer, a server computer, a desktop computer, a handset, a messaging device, a camera device, a multiprocessor system, a processor-based system, a consumer electronic device, and/or any other computing device.

The illustrative compute device 100 includes a processor 102, a memory 104, an input/output (I/O) subsystem 106, data storage 108, the sensor hub 110, and the always running timer 112. In some embodiments, one or more of the illustrative components of the compute device 100 may be incorporated in, or otherwise form a portion of, another component. For example, the memory 104, or portions thereof, may be incorporated in the processor 102 in some embodiments.

The processor 102 may be embodied as any type of processor capable of performing the functions described herein. For example, the processor 102 may be embodied as a single or multi-core processor(s), a single or multi-socket processor, a digital signal processor, a graphics processor, a microcontroller, or other processor or processing/controlling circuit. Similarly, the memory 104 may be embodied as any type of volatile or non-volatile memory or data storage capable of performing the functions described herein. In operation, the memory 104 may store various data and software used during operation of the compute device 100 such as operating systems, applications, programs, libraries, and drivers. The memory 104 is communicatively coupled to the processor 102 via the I/O subsystem 106, which may be embodied as circuitry and/or components to facilitate input/output operations with the processor 102, the memory 104, and other components of the compute device 100. For example, the I/O subsystem 106 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 106 may form a portion of a system-on-a-chip (SoC) and be incorporated, along with the processor 102, the memory 104, and other components of the compute device 100 on a single integrated circuit chip.

The data storage 108 may be embodied as any type of device or devices configured for the short-term or long-term storage of data. For example, the data storage 108 may include any one or more memory devices and circuits, memory cards, hard disk drives, solid-state drives, or other data storage devices.

The sensor hub 110 may be embodied as any device or set of devices capable of performing the described function. The sensor hub 110 may be embodied as an integrated circuit, an embedded system, components on a printed circuit board, and/or the like. In some embodiments, a portion of the sensor hub 110 may be embodied as a portion of a system-on-a-chip (SoC), together with some or all of the processor 102, the memory 104, and the I/O subsystem 106, with a portion of the sensor hub 110 (such as the one or more sensors 114) separate from the SoC. The illustrative sensor hub 110 includes the one or more sensors 114, the coarse-grained clock 116, the fine-grained clock 118, and the clock error register 120.

The one or more sensors 114 may include any type of sensor that may be used with a compute device 100. For example, the one or more sensors 114 may include a microphone, an image sensor, an accelerometer, a gyroscope, a light sensor, and/or the like.

The coarse-grained clock 116 may be embodied as any type of clock to produce timing values indicative of passage of time, such as a crystal oscillator or a ceramic oscillator, an inductor-capacitor (LC) clock, a resistor-capacitor (RC) clock, etc. The coarse-grained clock 116 may oscillate at any frequency, such as above or below 1, 2, 5, 10, 15, 20, 30, 35, 50, 100, or 250 kilohertz (kHz) or between any of those values. In the illustrative embodiment, the coarse-grained clock 116 oscillates at approximately 32 kHz or 32.768 kHz. The coarse-grained clock 116 has an associated timing value, which increases by one for every period of the coarse-grained clock 116 and may be stored in any manner, such as in a 64-bit register, a 32-bit register, a 16-bit register, a 10-bit register, an 8-bit register, etc. The timing value of the coarse-grained clock 116 may always increase, or may be able to be reset to zero (or set to a specific value) by an instruction of the compute device 100. In the illustrative embodiment, the coarse-grained clock 116 continues to run as long as power to the compute device 100 is available. In some embodiments, the coarse-grained clock 116 may be turned off (i.e., have its power removed) at certain times, such as when the sensor hub 110 is not capturing sensor data from the one or more sensors 114.

Similarly, the fine-grained clock 118 may be embodied as any type of clock to produce timing values indicative of passage of time, such as a crystal oscillator or a ceramic oscillator, an inductor-capacitor (LC) clock, a resistor-capacitor (RC) clock, etc. The fine-grained clock 118 may oscillate at any frequency, such as above or below 1, 2, 5, 10, 15, 20, 30, 35, 50, 100, or 250 megahertz (MHz) or between any of those values. In the illustrative embodiment, the fine-grained clock 118 oscillates at approximately 19.2 MHz. The fine-grained clock 118 has an associated timing value, which increases by one for every period of the fine-grained clock 118. The timing value of the fine-grained clock 118 may be stored in any manner, such as in a 64-bit register, a 32-bit register, a 16-bit register, a 10-bit register, an 8-bit register etc. The timing value of the fine-grained clock 118 may always increase, or may be able to be reset to zero (or set to a specific value) by an instruction of the compute device 100. In some embodiments, the timing value of the fine-grained clock 118 may reset to zero when the coarse-grained clock 116 changes value. The fine-grained clock 118 may be turned off (i.e., have its power removed) at certain times, such as when the sensor hub 110 is not capturing sensor data from the one or more sensors 114 or when the precision of the coarse-grained clock 116 is sufficient.

The clock error register 120 may be embodied as any type of register suitable for storing a clock error value. For example, the clock error register 120 may be embodied as a 64-bit register, a 32-bit register, a 16-bit register, a 10-bit register, an 8-bit register, etc. As described in more detail below, the value stored in the clock error register 120 may be used to correct for any drift in the timing between two clocks of the compute device 100, such as between the fine-grained clock 118 and the always running timer 112.

The always running timer 112 may be embodied as any type of clock to produce timing values indicative of passage of time, such as a crystal oscillator or a ceramic oscillator, an inductor-capacitor (LC) clock, a resistor-capacitor (RC) clock, etc. The always running timer 112 may oscillate at any frequency, such as above or below 1, 2, 5, 10, 15, 20, 30, 35, 50, 100, or 250 megahertz (MHz) or between any of those values. In the illustrative embodiment, always running timer 112 oscillates at approximately 19.2 MHz. The always running timer 112 has an associated timing value, which increases by one for every period of the always running timer 112. The timing value of the always running timer 112 may be stored in any manner, such as in a 64-bit register, a 32-bit register, a 16-bit register, a 10-bit register, an 8-bit register etc. The timing value of the always running timer 112 may always increase, or may be able to be reset to zero (or set to a specific value) by an instruction of the compute device 100. In the illustrative embodiment, the always running timer 112 is continues to run as long as power to the compute device 100 is available, and the always running timer 112 may have a battery used exclusively for the always running timer 112. In some embodiments, the always running timer 112 may be powered down in certain circumstances, such as when the compute device 100 is in a very lower power state such as a hibernation state or is completely turned off. It should be appreciated that, in the illustrative embodiment, each of the coarse-grained clock 116, fine-grained clock 118, and the always running timer 112 run as independent clocks, and are not synchronized or "locked," but rather are permitted to drift relative to each other. Of course, as described in more detail below, the drift of the various clocks may be tracked, allowing for digital synchronization in a manner that allows for correction of the drift. In other embodiments, some or all of the coarse-grained clock 116, fine-grained clock 118, and the always running timer 112 may be synchronized or "locked" some of the time. For example, the fine-grained clock 118 and the always running timer 112 may be "locked" when the compute device 100 is not in a standby mode.

Of course, in some embodiments, the compute device 100 may include additional components often found in a compute device 100, such as a communication circuit 122 and/or one or more peripheral devices 124. The communication circuit 122 may be embodied as any type of communication circuit, device, or collection thereof, capable of enabling communications between the compute device 100 and other devices. To do so, the communication circuit 122 may be configured to use any one or more communication technology and associated protocols (e.g., Ethernet, Bluetooth®, Wi-Fi®, WiMAX, near field communication (NFC), etc.) to effect such communication. The peripheral devices 124 may include a keyboard, a mouse, a display, etc.

It should be appreciated that the compute device 100 is able to enter a low-power or standby mode. In the standby mode, the compute device 100 may reduce or remove power from certain components, such as from a portion or all of each of the processor 102, the memory 104, and/or the I/O subsystem 106. In the standby mode, the always running timer 112 (and, specifically, the timing value of the always running timer 112) may not be accessible to the sensor hub 110.

Figure 2:
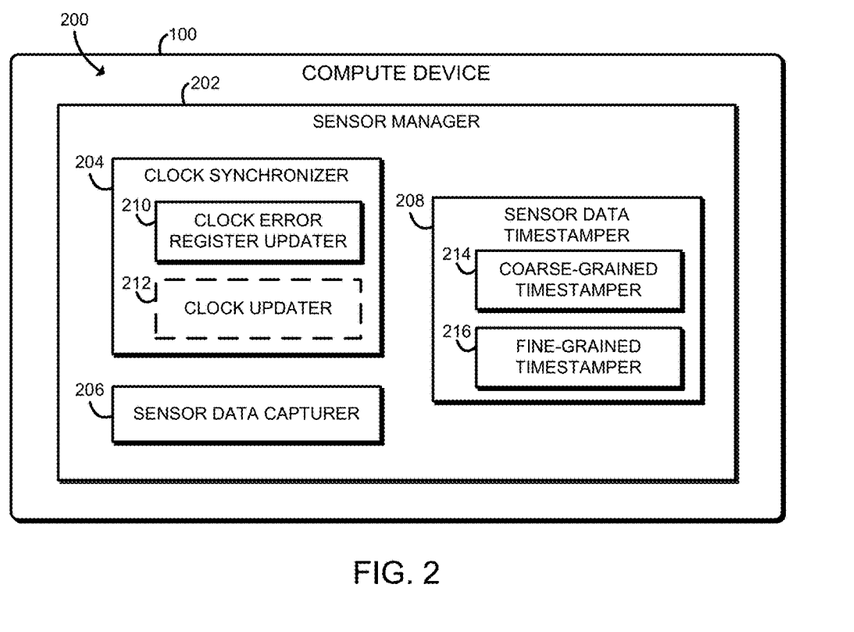
FIG. 2 is a block diagram of at least one embodiment of an environment that may be established by the compute device of FIG. 1.

Referring now to FIG. 2, in use, the compute device 100 may establish an environment 200. The illustrative environment 200 includes a sensor manager 202. It should be appreciated that, in use, the environment 200 of the compute device 100 may include additional components not shown in FIG. 2 to perform computation tasks that may be executed by the compute device 100. The various components of the environment 200 may be embodied as hardware, firmware, software, or a combination thereof. As such, in some embodiments, one or more of the components of the environment 200 may be embodied as circuitry or collection of electrical devices (e.g., a sensor manager circuit 202). It should be appreciated that, in such embodiments, the sensor manager 202 may form a portion of one or more of the sensor hub 110, the processor 102, the I/O subsystem 106, the communication circuit 122, and/or other components of the compute device 100. Additionally, in some embodiments, one or more of the illustrative components may form a portion of another component and/or one or more of the illustrative components may be independent of one another. Further, in some embodiments, one or more of the components of the environment 200 may be embodied as virtualized hardware components or emulated architecture, which may be established and maintained by the processor 102 or other components of the compute device 100.

The sensor manager 202 includes a clock synchronizer 204, a sensor data capturer 206, and a sensor data timestamper 208. The clock synchronizer 204 is configured to synchronize the fine-grained clock 118 and/or the coarse-grained clock 116 with the always running timer 112 by determining and storing the error between the clocks being synchronized. The clock synchronizer 204 may determine the error in any way, which may depend on the particular embodiment. For example, when the fine-grained clock 118 and the always running timer 112 run at the same rate (e.g., 19.2 MHz), the error between those two clocks may be determined by determining a timing value from the fine-grained clock 118 and the always running timer 112, and then determining the difference between the timing values. In embodiments where the clock rates are not the same, the timing value of one or both clocks being compared may need to be converted to compensate for the difference in the clock rates, such as by multiplying one of the timing values by the ratio of the clock rates. In the illustrative embodiment, once the clock synchronizer 204 has determined the clock error, a clock error register updater 210 updates the clock error register 120 with the clock error. In some embodiments, the clock synchronizer 204 may include a clock updater 212, which may update a timing value of the fine-grained clock 118 (and/or the coarse-grained clock 116) directly. However, it should be appreciated that using the clock updater 212 may cause invalid or erroneous timestamps in some cases, and using the clock error register updater 210 with the clock error register 120 may avoid those invalid or erroneous timestamps.

The sensor data capturer 206 is configured to capture sensor data. The sensor data capturer 206 may capture sensor data from any one or more of the one or more sensors 114 periodically, continually, and/or continuously. The sensor data capturer 206 may capture sensor data even when the compute device 100 is in a standby mode. The sensor data capturer 206 may, in some instances, request a timestamp corresponding to the capturing of the sensor data. In other instances, some or all of the sensor data may not require a corresponding timestamp.

The sensor data timestamper 208 is configured to determine a timestamp associated with the capturing of sensor data. The illustrative sensor data timestamper 208 includes a coarse-grained timestamper 214 and a fine-grained timestamper 216. In the illustrative embodiment, the sensor data timestamper 208 may be configured to capture either a coarse-grained timestamp or a fine-grained timestamp, depending on the particular application and the sensor data being acquired. The coarse-grained timestamper 214 is configured to capture a timing value from the coarse-grained clock 116, and to determine a timestamp based on the timing value and the value of the clock error register 120. The fine-grained timestamper 216 is configured to capture a timing value from each of the coarse-grained clock 116 and the fine-grained clock 118, and to determine a timestamp based on the timing value and the value of the clock error register 120. For more discussion of calculating a timestamp based on the timing values and the value of the clock error register, see discussion below in regard to FIG. 5.

It should be appreciated that, in some embodiments, the fine-grained timestamper 216 may determine a timestamp based only on a timing value of the fine-grained clock 118 and the value of the clock error register 120. For example, some embodiments may not have a coarse-grained clock 116, or may have a fine-grained clock 118 that can keep track of time without relying on a coarse-grained clock 116, such as by storing a timing value of the fine-grained clock 118 in a register with a large number of bits, such as 64 bits. It should further be appreciated that, in some embodiments, the fine-grained timestamper 216 may determine a timestamp based on a timing value of the fine-grained clock 118, and need not consider the value of the clock error register 120, such as in embodiments where a timing value of the fine-grained timestamper 216 is updated directly by the clock updater 212, as described above.

Similarly, the coarse-grained timestamper 214 may determine a timestamp based only on a timing value of the coarse-grained clock 118 and the value of the clock error register 120. For example, some embodiments may not have a fine-grained clock 118, or the fine-grained clock 118 may be turned off in order to save power or when the higher precision timestamps are not required. In some embodiments, the coarse-grained timestamper 214 may determine a timestamp based on a timing value of the coarse-grained clock 118, and need not consider the value of the clock error register 120, such as in embodiments where a timing value of the coarse-grained timestamper 214 is updated directly by the clock updater 212, as described above.

Figure 3:
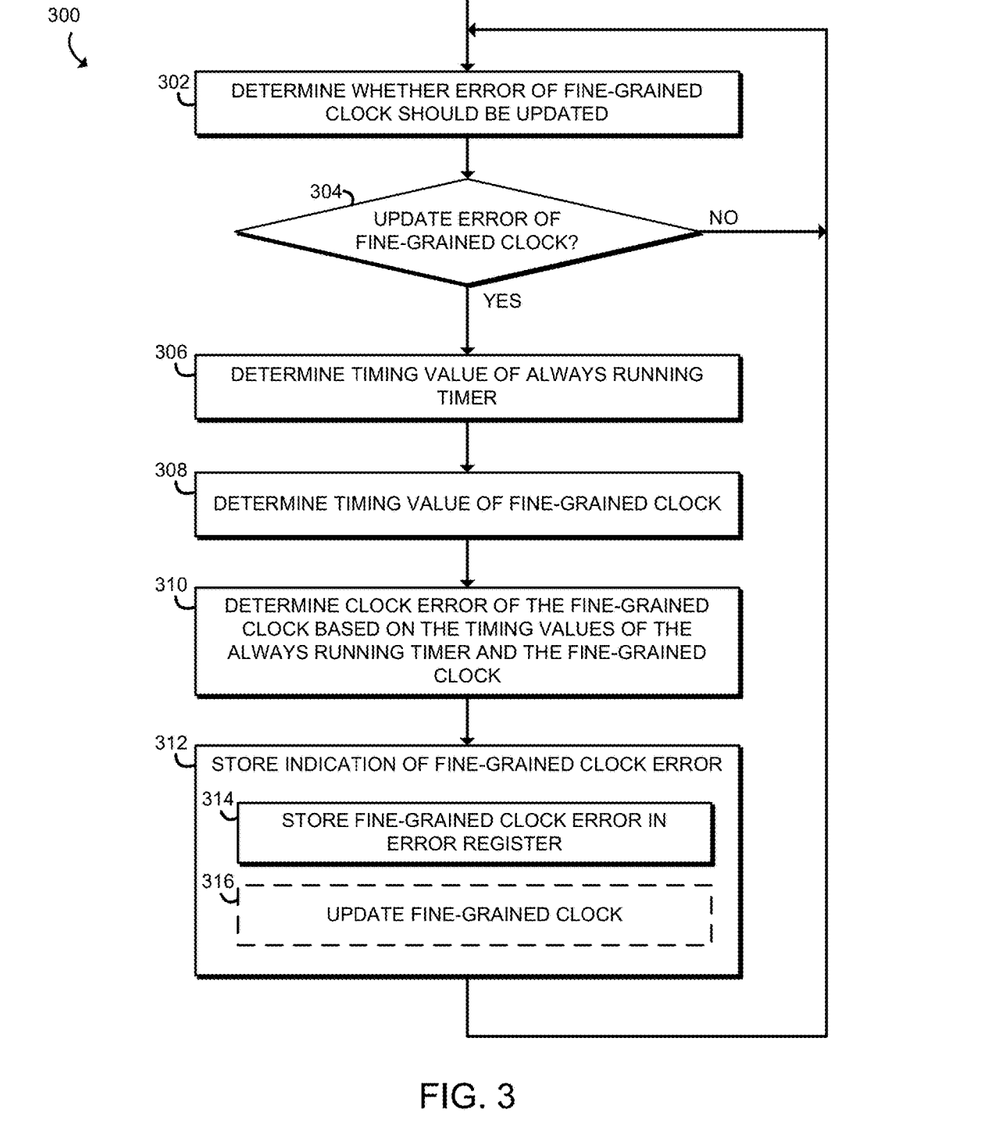
FIG. 3 is a simplified flow diagram of at least one embodiment of a method for determining a clock error that may be executed by the compute device of FIG. 1.

Referring now to FIG. 3, in use, the compute device 100 may execute a method 300 for synchronizing an always running timer 112 of the compute device 100 with a fine-grained clock 118 of the compute device 100. The method 300 begins in block 302 in which the compute device 100 determines whether the error of the fine-grained clock 118 should be updated. In the illustrative embodiment, the error of the fine-grained clock 118 is updated every time the compute device 100 exits a low-power standby mode, and is then updated periodically as long as the compute device 100 remains out of the standby mode. It should be appreciated that, in the illustrative embodiment, the compute device 100 cannot update the error of the fine-grained clock 118 while the compute device 100 is in the low-power standby mode.

In block 304, if the compute device 100 should not update the error of the fine-grained clock 118, the method 300 loops back to block 302. Otherwise, if the compute device 100 should update the error of the fine-grained clock 118, the method 300 proceeds to block 304.

In block 306, the compute device 100 determines a timing value of the always running timer 112, such as by copying a value stored in a timing register of the always running timer 112. In block 308, the compute device 100 similarly determines a timing value of the fine-grained clock 118, such as by copying a value stored in a timing register of the fine-grained clock 118.

In block 310, the compute device 100 determines a clock error of the fine-grained block 118 by determining a difference between the timing values of the always running timer 112 and the fine-grained clock 118. In the illustrative embodiment, the rate of the always running timer 112 is the same as the rate of the fine-grained clock 118, and the difference may be determined by simply subtracting the timing value of one from the other. In some embodiments, the rate of the always running timer 112 may be slightly or significantly different from the rate of the fine-grained clock 118, and a conversion of one or both of the timing values may need to be performed before a difference between the timing values can be determined.

In block 312, the compute device 100 stores an indication of the clock error of the fine-grained clock 118. In the illustrative embodiment, the compute device 100 stores the indication of the clock error by storing the value of the clock error in the clock error register in block 314. In some embodiments, the compute device 100 may store the indication of the clock error by directly updating the timing value of the fine-grained clock 118 based on the determined clock error in block 316. The method 300 then loops back to block 302.

It should be appreciated that the method 300 may, in some embodiments, be executed in a similar manner, but for synchronizing the always running timer 112 with the coarse-grained clock 216. For example, in such an embodiment, the method 300 would determine in block 302 if the error of the coarse-grained clock 114 should be updated, determine the timing value of the coarse-grained clock 114 in block 308, etc.

Figure 4:
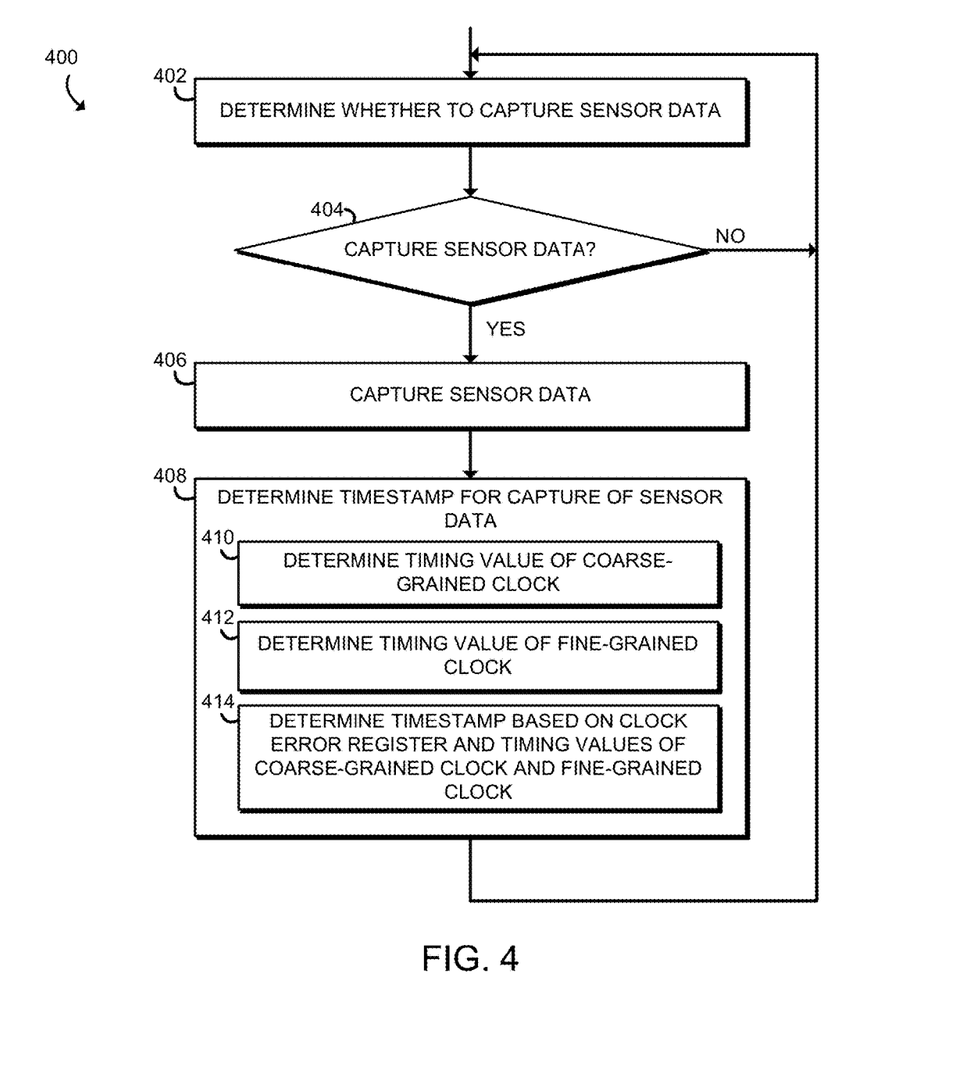
FIG. 4 is a simplified flow diagram of at least one embodiment of a method for low-power capture of sensor values with high-accuracy timestamps that may be executed by the compute device of FIG. 1.

Referring now to FIG. 4, in use, the compute device 100 may execute a method 400 for capturing sensor data with a high-precision timestamp. The method 400 begins in block 402, in which the compute device 100 determines whether to capture sensor data. The compute device 100 may capture sensor data in any number of ways, such as periodically, continuously, continually, or when so instructed by an instruction of a program of the compute device 100.

In block 404, if the compute device 100 should not capture sensor data, the compute device 100 loops back to block 402. Otherwise, if the compute device 100 should capture sensor data, the compute device 100 proceeds to block 406. In block 406, the compute device 100 captures sensor data from one or more of the one or more sensors 114.

In block 408, the compute device 100 determines a timestamp corresponding to the captured sensor data. In the illustrative embodiment, the compute device 100 determines a timing value of the coarse-grained clock 116 in block 410 and determines a timing value of the fine-grained clock 118 in block 412. The compute device 100 then determines a timestamp based on the timing values of the coarse-grained clock 116 and the fine-grained clock 118 as well as the value of the clock error register 120. Of course, as described above, in some embodiments, the compute device 100 may determine a timestamp without the timing value of the coarse-grained clock 116 and/or without the clock error register 120. Additionally, in some embodiments, the compute device 100 may determine a timestamp without the timing value of the fine-grained clock 118 (and either with or without the value of the clock error register 120), such as when the fine-grained clock 118 is powered down.

Figure 5:
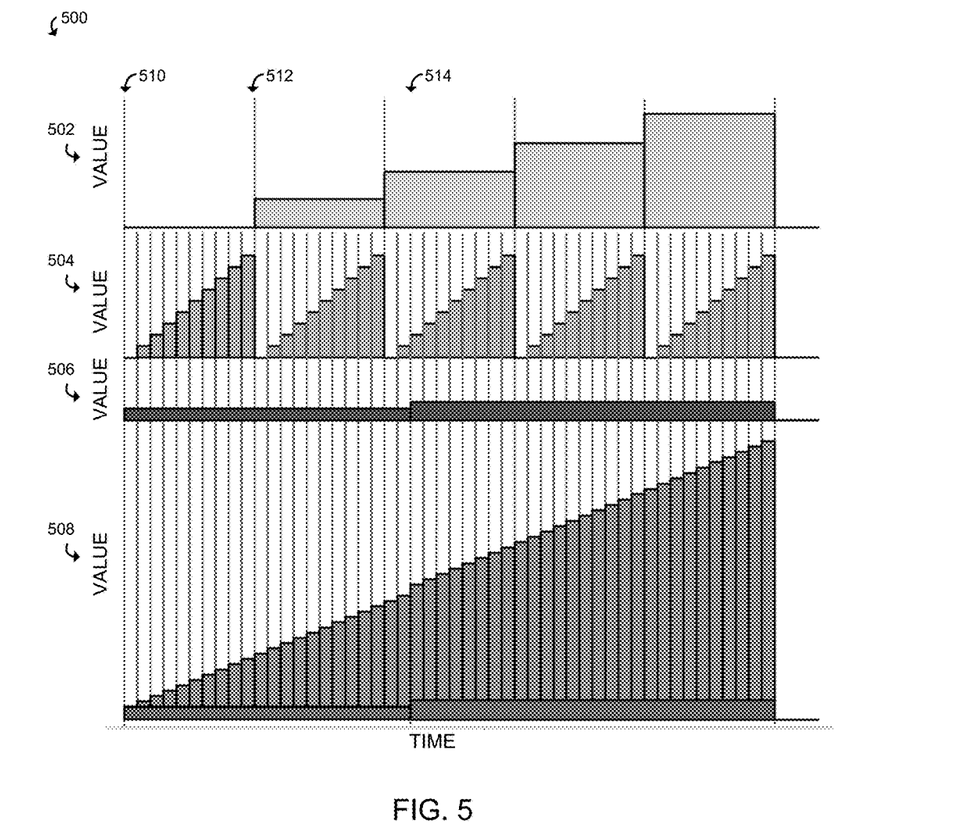
FIG. 5 is a simplified diagram showing one embodiment of values as a function of time of a counter system of the compute device of FIG. 1.

Referring now to FIG. 5, a simplified diagram shows various values of the compute device 100 as a function of time. A data series 502 shows a value of the coarse-grained clock 116 as a function of time, a data series 504 shows a value of the fine-grained clock 118 as a function of time, a data series 506 shows a value of the clock error register 120 as a function of time, and a data series 508 shows a calculated value of a timestamp as a function of time. At a first time 510, the value of the coarse-grained clock 116 is zero, and the value of the coarse-grained clock 116 increases by the same amount (e.g., by one) after each period of the coarse-grained clock 116, such as at a second time 512.

At the first time 510, the value of the fine-grained clock 118 is also zero, and the value of the fine-grained clock 118 increases by the same amount (e.g., by one) after each period of the fine-grained clock 118. In the example shown, the value of the fine-grained clock 118 is reset to zero each time the value of the coarse-grained clock 116 increases, such as at the second time 512.

At the first time 510, the value of the clock error register 120 is one. As described above in regard to FIG. 3, the compute device 100 may, from time to time, compare a timing value of the always running timer 112 to a timing value of the coarse-grained clock 116 and/or the fine-grained clock 118. The compute device 100 does such a comparison at time 514, determines that the clock error has changed to a value of 2 (due to, e.g., temporal drift between the clocks), and updates the value of the clock error register 120 accordingly.

The data series 508 shows the timestamp value as a function of time. In the illustrative embodiment, the compute device 100 determines the timestamp by adding the timing value of the coarse-grained clock 116 (with a scaling factor to compensate for the lower clock rate) with the timing value of the fine-grained clock 118 and with the value of the clock error register 120. As shown in FIG. 5, in the illustrative embodiment, the timestamp increases by the same amount of the fine-grained clock 118 each time the fine-grained clock 118 changes value, except for when the clock error register 120 also changes value, in which case the timestamp may increase a different amount as shown at the third time 514.

As shown in FIG. 5, the frequency of the fine-grained clock 116 may be an exact multiple of the coarse-grained clock 118. It should be appreciated that, in some embodiments, the frequency of the fine-grained clock 116 may not be an exact multiple of the coarse-grained clock 118.

EXAMPLES

Illustrative examples of the devices, systems, and methods disclosed herein are provided below. An embodiment of the devices, systems, and methods may include any one or more, and any combination of, the examples described below.

Example 1 includes a compute device for low-power capture of sensor values with high-accuracy timestamps, the compute device comprising an always running timer (ART) to produce timing values indicative of passage of time; and a sensor hub comprising one or more sensors and a fine-grained clock, the fine-grained clock to produce timing values indicative of passage of time and the sensor hub to determine a first timing value of the ART; determine a second timing value of the fine-grained clock; determine a clock error of the fine-grained clock based on the first timing value and the second timing value; store an indication of the clock error in the sensor hub; capture, while the compute device is in a standby mode, sensor data from the one or more sensors; determine, while the compute device is in the standby mode, a third timing value of the fine-grained clock associated with the capture of the sensor data; and determine a timestamp associated with the capture of the sensor data based on the third timing value and the indication of the clock error, wherein the ART is inaccessible to the sensor hub while the compute device is in the standby mode.

Example 2 includes the subject matter of Example 1, and wherein the sensor hub further comprises a coarse-grained clock to produce timing values indicative of passage of time, wherein the sensor hub is further to determine a fourth timing value of the coarse-grained clock, wherein to determine the timestamp associated with the capture of the sensor data comprises to determine the timestamp associated with the capture of the sensor data further based on the fourth timing value.

Example 3 includes the subject matter of any of Examples 1 and 2, and wherein a rate of change of the fine-grained clock is greater than 10 megahertz and a rate of change of the coarse-grained clock is less than 50 kilohertz.

Example 4 includes the subject matter of any of Examples 1-3, and wherein the sensor hub further comprises a clock error register, wherein to store the indication of the clock error comprises to store the clock error in the clock error register, and wherein to determine the timestamp associated with the capture of the sensor data comprises to determine the timestamp associated with the capture of the sensor data based on the third timing value and the clock error stored in the clock error register.

Example 5 includes the subject matter of any of Examples 1-4, and wherein to store the indication of the clock error comprises to update the fine-grained clock based on the clock error, wherein to determine the timestamp associated with the capture of the sensor data based on the third timing value and the indication of the clock error comprises to determine the timestamp associated with the capture of the sensor data based on the third timing value of the updated fine-grained clock.

Example 6 includes the subject matter of any of Examples 1-5, and wherein the sensor hub further comprises a coarse-grained clock to produce timing values indicative of passage of time, wherein the sensor hub is further to capture additional sensor data from the one or more sensors while the compute device is in the standby mode and while the fine-grained clock is powered down; determine a fourth timing value of the coarse-grained clock associated with the capture of the additional sensor data while the compute device is in the standby mode and while the fine-grained clock is powered down; determine a timestamp associated with the capture of the additional sensor data based on the fourth timing value of the coarse-grained clock.

Example 7 includes the subject matter of any of Examples 1-6, and wherein to determine the clock error of the fine-grained clock comprises to determine the clock error of the fine-grained clock in response to an exit of the compute device from the standby mode.

Example 8 includes the subject matter of any of Examples 1-7, and wherein the sensor hub is further to wait, while the compute device is out of the standby mode, for a pre-determined period of time; and update, in response to waiting the pre-determined period of time, the clock error of the fine-grained clock, wherein to update the clock error of the fine-grained clock comprises to determine a fourth timing value of the ART; determine a fifth timing value of the fine-grained clock; determine an updated clock error of the fine-grained clock based on the first timing value and the second timing value; and store an indication of the updated clock error in the sensor hub.

Example 9 includes the subject matter of any of Examples 1-8, and wherein the standby mode of the compute device comprises a mode in which the compute device powers down at least a portion of the compute device.

Example 10 includes the subject matter of any of Examples 1-9, and wherein the standby mode of the compute device comprises a mode in which at least a portion of a volatile memory of the compute device is powered down.

Example 11 includes the subject matter of any of Examples 1-10, and wherein the standby mode of the compute device comprises a mode in which at least a portion of a processor of the compute device is powered down.

Example 12 includes the subject matter of any of Examples 1-11, and wherein a rate of change of the ART is different from a rate of change of the fine-grained clock.

Example 13 includes a method for low-power capture of sensor values with high-accuracy timestamps by a compute device, the method comprising determining, by the compute device, a first timing value of an always running timer (ART) of the compute device, wherein the ART is to produce timing values indicative of passage of time; determining, by the compute device, a second timing value of a fine-grained clock of a sensor hub of the compute device, wherein the sensor hub comprises one or more sensors and wherein the fine-grained clock is to produce timing values indicative of passage of time; determining, by the compute device, a clock error of the fine-grained clock based on the first timing value and the second timing value; storing, by the compute device, an indication of the clock error in the sensor hub; capturing, by the sensor hub and while the compute device is in a standby mode, sensor data from the one or more sensors; determining, by the sensor hub and while the compute device is in the standby mode, a third timing value of the fine-grained clock associated with the capture of the sensor data; and determining, by the sensor hub, a timestamp associated with the capture of the sensor data based on the third timing value and the indication of the clock error, wherein the ART is inaccessible to the sensor hub while the compute device is in the standby mode.

Example 14 includes the subject matter of Example 13, and further including determining, by the compute device, a fourth timing value of a coarse-grained clock of the sensor hub, wherein the coarse-grained clock is to produce timing values indicative of passage of time and wherein determining the timestamp associated with the capture of the sensor data comprises determining the timestamp associated with the capture of the sensor data further based on the fourth timing value.

Example 15 includes the subject matter of any of Examples 13 and 14, and wherein a rate of change of the fine-grained clock is greater than 10 megahertz and a rate of change of the coarse-grained clock is less than 50 kilohertz.

Example 16 includes the subject matter of any of Examples 13-15, and wherein storing the indication of the clock error comprises storing the clock error in a clock error register of the sensor hub, and wherein determining the timestamp associated with the capture of the sensor data comprises determining the timestamp associated with the capture of the sensor data based on the third timing value and the clock error stored in the clock error register.

Example 17 includes the subject matter of any of Examples 13-16, and wherein storing the indication of the clock error comprises updating the fine-grained clock based on the clock error, wherein determining the timestamp associated with the capture of the sensor data based on the third timing value and the indication of the clock error comprises determining the timestamp associated with the capture of the sensor data based on the third timing value of the updated fine-grained clock.

Example 18 includes the subject matter of any of Examples 13-17, and further including capturing, by the sensor hub, additional sensor data from the one or more sensors while the compute device is in the standby mode and while the fine-grained clock is powered down; determining, by the sensor hub, a fourth timing value of a coarse-grained clock of the sensor hub associated with the capture of the additional sensor data while the compute device is in the standby mode and while the fine-grained clock is powered down, wherein the coarse-grained clock is to produce timing values indicative of passage of time; determining, by the sensor hub, a timestamp associated with the capture of the additional sensor data based on the fourth timing value of the coarse-grained clock.

Example 19 includes the subject matter of any of Examples 13-18, and wherein determining the clock error of the fine-grained clock comprises determining the clock error of the fine-grained clock in response to an exit of the compute device from the standby mode.

Example 20 includes the subject matter of any of Examples 13-19, and further including waiting, by the compute device and while the compute device is out of the standby mode, for a pre-determined period of time; and updating, by the compute device and in response to waiting the pre-determined period of time, the clock error of the fine-grained clock, wherein updating the clock error of the fine-grained clock comprises determining, by the compute device, a fourth timing value of the ART; determining, by the compute device, a fifth timing value of the fine-grained clock; determining, by the compute device, an updated clock error of the fine-grained clock based on the first timing value and the second timing value; and storing, by the compute device, an indication of the updated clock error in the sensor hub.

Example 21 includes the subject matter of any of Examples 13-20, and wherein the standby mode of the compute device comprises a mode in which the compute device powers down at least a portion of the compute device.

Example 22 includes the subject matter of any of Examples 13-21, and wherein the standby mode of the compute device comprises a mode in which at least a portion of a volatile memory of the compute device is powered down.

Example 23 includes the subject matter of any of Examples 13-22, and wherein the standby mode of the compute device comprises a mode in which at least a portion of a processor of the compute device is powered down.

Example 24 includes the subject matter of any of Examples 13-23, and wherein a rate of change of the ART is different from a rate of change of the fine-grained clock.

Example 25 includes one or more computer-readable media comprising a plurality of instructions thereon that, when executed, causes a compute device to perform the method of any of Examples 13-24.

Example 26 includes a compute device for low-power capture of sensor values with high-accuracy timestamps, the compute device comprising means for determining, by the compute device, a first timing value of an always running timer (ART) of the compute device, wherein the ART is to produce timing values indicative of passage of time; means for determining, by the compute device, a second timing value of a fine-grained clock of a sensor hub of the compute device, wherein the sensor hub comprises one or more sensors and wherein the fine-grained clock is to produce timing values indicative of passage of time; means for determining, by the compute device, a clock error of the fine-grained clock based on the first timing value and the second timing value; means for storing, by the compute device, an indication of the clock error in the sensor hub; means for capturing, by the sensor hub and while the compute device is in a standby mode, sensor data from the one or more sensors; means for determining, by the sensor hub and while the compute device is in the standby mode, a third timing value of the fine-grained clock associated with the capture of the sensor data; and means for determining, by the sensor hub, a timestamp associated with the capture of the sensor data based on the third timing value and the indication of the clock error, wherein the ART is inaccessible to the sensor hub while the compute device is in the standby mode.

Example 27 includes the subject matter of Example 26, and further including means for determining, by the compute device, a fourth timing value of a coarse-grained clock of the sensor hub, wherein the coarse-grained clock is to produce timing values indicative of passage of time and wherein the means for determining the timestamp associated with the capture of the sensor data comprises means for determining the timestamp associated with the capture of the sensor data further based on the fourth timing value.

Example 28 includes the subject matter of any of Examples 26 and 27, and wherein a rate of change of the fine-grained clock is greater than 10 megahertz and a rate of change of the coarse-grained clock is less than 50 kilohertz.

Example 29 includes the subject matter of any of Examples 26-28, and wherein the means for storing the indication of the clock error comprises means for storing the clock error in a clock error register of the sensor hub, and wherein the means for determining the timestamp associated with the capture of the sensor data comprises means for determining the timestamp associated with the capture of the sensor data based on the third timing value and the clock error stored in the clock error register.

Example 30 includes the subject matter of any of Examples 26-29, and wherein the means for storing the indication of the clock error comprises means for updating the fine-grained clock based on the clock error, wherein the means for determining the timestamp associated with the capture of the sensor data based on the third timing value and the indication of the clock error comprises means for determining the timestamp associated with the capture of the sensor data based on the third timing value of the updated fine-grained clock.

Example 31 includes the subject matter of any of Examples 26-30, and further including means for capturing, by the sensor hub, additional sensor data from the one or more sensors while the compute device is in the standby mode and while the fine-grained clock is powered down; means for determining, by the sensor hub, a fourth timing value of a coarse-grained clock of the sensor hub associated with the capture of the additional sensor data while the compute device is in the standby mode and while the fine-grained clock is powered down, wherein the coarse-grained clock is to produce timing values indicative of passage of time; means for determining, by the sensor hub, a timestamp associated with the capture of the additional sensor data based on the fourth timing value of the coarse-grained clock.

Example 32 includes the subject matter of any of Examples 26-31, and wherein the means for determining the clock error of the fine-grained clock comprises means for determining the clock error of the fine-grained clock in response to an exit of the compute device from the standby mode.

Example 33 includes the subject matter of any of Examples 26-32, and further including means for waiting, by the compute device and while the compute device is out of the standby mode, for a pre-determined period of time; and means for updating, by the compute device and in response to waiting the pre-determined period of time, the clock error of the fine-grained clock, wherein the means for updating the clock error of the fine-grained clock comprises means for determining, by the compute device, a fourth timing value of the ART; means for determining, by the compute device, a fifth timing value of the fine-grained clock; means for determining, by the compute device, an updated clock error of the fine-grained clock based on the first timing value and the second timing value; and means for storing, by the compute device, an indication of the updated clock error in the sensor hub.

Example 34 includes the subject matter of any of Examples 26-33, and wherein the standby mode of the compute device comprises a mode in which the compute device powers down at least a portion of the compute device.

Example 35 includes the subject matter of any of Examples 26-34, and wherein the standby mode of the compute device comprises a mode in which at least a portion of a volatile memory of the compute device is powered down.

Example 36 includes the subject matter of any of Examples 26-35, and wherein the standby mode of the compute device comprises a mode in which at least a portion of a processor of the compute device is powered down.

Example 37 includes the subject matter of any of Examples 26-36, and wherein a rate of change of the ART is different from a rate of change of the fine-grained clock.

The invention claimed is:

1. A compute device for low-power capture of sensor values with high-accuracy timestamps, the compute device comprising:
an always running timer (ART) to produce timing values indicative of passage of time; and
a sensor hub comprising one or more sensors and a fine-grained clock, the fine-grained clock to produce timing values indicative of passage of time and the sensor hub to:
determine a first timing value of the ART;
determine a second timing value of the fine-grained clock;
determine a clock error of the fine-grained clock based on the first timing value and the second timing value;
store an indication of the clock error in the sensor hub;
capture, while the compute device is in a standby mode, sensor data from the one or more sensors;
determine, while the compute device is in the standby mode, a third timing value of the fine-grained clock associated with the capture of the sensor data; and
determine a timestamp associated with the capture of the sensor data based on the third timing value and the indication of the clock error,
wherein the ART is inaccessible to the sensor hub while the compute device is in the standby mode.

2. The compute device of claim 1, wherein the sensor hub further comprises a clock error register, wherein to store the indication of the clock error comprises to store the clock error in the clock error register, and wherein to determine the timestamp associated with the capture of the sensor data comprises to determine the timestamp associated with the capture of the sensor data based on the third timing value and the clock error stored in the clock error register.

3. The compute device of claim 1, wherein to store the indication of the clock error comprises to update the fine-grained clock based on the clock error,
wherein to determine the timestamp associated with the capture of the sensor data based on the third timing value and the indication of the clock error comprises to determine the timestamp associated with the capture of the sensor data based on the third timing value of the updated fine-grained clock.

4. The compute device of claim 1, wherein the sensor hub further comprises a coarse-grained clock to produce timing values indicative of passage of time, wherein the sensor hub is further to:
capture additional sensor data from the one or more sensors while the compute device is in the standby mode and while the fine-grained clock is powered down;
determine a fourth timing value of the coarse-grained clock associated with the capture of the additional sensor data while the compute device is in the standby mode and while the fine-grained clock is powered down;

determine a timestamp associated with the capture of the additional sensor data based on the fourth timing value of the coarse-grained clock.

5. The compute device of claim 1, wherein to determine the clock error of the fine-grained clock comprises to determine the clock error of the fine-grained clock in response to an exit of the compute device from the standby mode.

6. The compute device of claim 5, wherein the sensor hub is further to:

wait, while the compute device is out of the standby mode, for a pre-determined period of time; and update, in response to waiting the pre-determined period of time, the clock error of the fine-grained clock, wherein to update the clock error of the fine-grained clock comprises to:

determine a fourth timing value of the ART;

determine a fifth timing value of the fine-grained clock;

determine an updated clock error of the fine-grained clock based on the first timing value and the second timing value; and store an indication of the updated clock error in the sensor hub.

7. The compute device of claim 1, wherein the standby mode of the compute device comprises a mode in which the compute device powers down at least a portion of the compute device.

8. The compute device of claim 1, wherein the standby mode of the compute device comprises a mode in which at least a portion of a volatile memory of the compute device is powered down.

9. The compute device of claim 8, wherein the standby mode of the compute device comprises a mode in which at least a portion of a processor of the compute device is powered down.

10. A method for low-power capture of sensor values with high-accuracy timestamps by a compute device, the method comprising:

determining, by the compute device, a first timing value of an always running timer (ART) of the compute device, wherein the ART is to produce timing values indicative of passage of time;

determining, by the compute device, a second timing value of a fine-grained clock of a sensor hub of the compute device, wherein the sensor hub comprises one or more sensors and wherein the fine-grained clock is to produce timing values indicative of passage of time;

determining, by the compute device, a clock error of the fine-grained clock based on the first timing value and the second timing value;

storing, by the compute device, an indication of the clock error in the sensor hub;

capturing, by the sensor hub and while the compute device is in a standby mode, sensor data from the one or more sensors;

determining, by the sensor hub and while the compute device is in the standby mode, a third timing value of the fine-grained clock associated with the capture of the sensor data; and determining, by the sensor hub, a timestamp associated with the capture of the sensor data based on the third timing value and the indication of the clock error, wherein the ART is inaccessible to the sensor hub while the compute device is in the standby mode.

11. The method of claim 10, wherein storing the indication of the clock error comprises storing the clock error in a clock error register of the sensor hub, and wherein determining the timestamp associated with the capture of the sensor data comprises determining the timestamp associated with the capture of the sensor data based on the third timing value and the clock error stored in the clock error register.

12. The method of claim 10, wherein storing the indication of the clock error comprises updating the fine-grained clock based on the clock error, wherein determining the timestamp associated with the capture of the sensor data based on the third timing value and the indication of the clock error comprises determining the timestamp associated with the capture of the sensor data based on the third timing value of the updated fine-grained clock.

13. The method of claim 10, further comprising:

capturing, by the sensor hub, additional sensor data from the one or more sensors while the compute device is in the standby mode and while the fine-grained clock is powered down;

determining, by the sensor hub, a fourth timing value of a coarse-grained clock of the sensor hub associated with the capture of the additional sensor data while the compute device is in the standby mode and while the fine-grained clock is powered down, wherein the coarse-grained clock is to produce timing values indicative of passage of time;

determining, by the sensor hub, a timestamp associated with the capture of the additional sensor data based on the fourth timing value of the coarse-grained clock.

14. The method of claim 10, wherein determining the clock error of the fine-grained clock comprises determining the clock error of the fine-grained clock in response to an exit of the compute device from the standby mode.

15. The method of claim 14, further comprising:

waiting, by the compute device and while the compute device is out of the standby mode, for a pre-determined period of time; and updating, by the compute device and in response to waiting the pre-determined period of time, the clock error of the fine-grained clock, wherein updating the clock error of the fine-grained clock comprises:

determining, by the compute device, a fourth timing value of the ART;

determining, by the compute device, a fifth timing value of the fine-grained clock;

determining, by the compute device, an updated clock error of the fine-grained clock based on the first timing value and the second timing value; and storing, by the compute device, an indication of the updated clock error in the sensor hub.

16. The method of claim 10, wherein the standby mode of the compute device comprises a mode in which the compute device powers down at least a portion of the compute device.

17. The method of claim 10, wherein the standby mode of the compute device comprises a mode in which at least a portion of a volatile memory of the compute device is powered down.

18. One or more non-transitory computer-readable media comprising a plurality of instructions thereon that, when executed, causes a compute device to:

determine a first timing value of an always running timer (ART) of the compute device, wherein the ART is to produce timing values indicative of passage of time;

determine a second timing value of a fine-grained clock, wherein the fine-grained clock is to produce timing values indicative of passage of time and a sensor hub of the compute device comprises the fine-grained clock;

determine a clock error of the fine-grained clock based on the first timing value and the second timing value;

store an indication of the clock error in the sensor hub;

capture, while the compute device is in a standby mode, sensor data from one or more sensors of the sensor hub;

determine, while the compute device is in the standby mode, a third timing value of the fine-grained clock associated with the capture of the sensor data; and determine a timestamp associated with the capture of the sensor data based on the third timing value and the indication of the clock error, wherein the ART is inaccessible to the sensor hub while the compute device is in the standby mode.

19. The one or more non-transitory computer-readable media of claim 18, wherein the sensor hub further comprises a clock error register, wherein to store the indication of the clock error comprises to store the clock error in the clock error register, and wherein to determine the timestamp associated with the capture of the sensor data comprises to determine the timestamp associated with the capture of the sensor data based on the third timing value and the clock error stored in the clock error register.

20. The one or more non-transitory computer-readable media of claim 18, wherein to store the indication of the clock error comprises to update the fine-grained clock based on the clock error, wherein to determine the timestamp associated with the capture of the sensor data based on the third timing value and the indication of the clock error comprises to determine the timestamp associated with the capture of the sensor data based on the third timing value of the updated fine-grained clock.

21. The one or more non-transitory computer-readable media of claim 18, wherein the sensor hub further comprises a coarse-grained clock to produce timing values indicative of passage of time, wherein the plurality of instructions further causes the compute device to:

capture additional sensor data from the one or more sensors while the compute device is in the standby mode and while the fine-grained clock is powered down;

determine a fourth timing value of the coarse-grained clock associated with the capture of the additional sensor data while the compute device is in the standby mode and while the fine-grained clock is powered down;

determine a timestamp associated with the capture of the additional sensor data based on the fourth timing value of the coarse-grained clock.

22. The one or more non-transitory computer-readable media of claim 18, wherein to determine the clock error of the fine-grained clock comprises to determine the clock error of the fine-grained clock in response to an exit of the compute device from the standby mode.

23. The one or more non-transitory computer-readable media of claim 22, wherein the plurality of instructions further cause the compute device to:

wait, while the compute device is out of the standby mode, for a pre-determined period of time; and update, in response to waiting the pre-determined period of time, the clock error of the fine-grained clock, wherein to update the clock error of the fine-grained clock comprises to:

determine a fourth timing value of the ART;

determine a fifth timing value of the fine-grained clock;

determine an updated clock error of the fine-grained clock based on the first timing value and the second timing value; and store an indication of the updated clock error in the sensor hub.

24. The one or more non-transitory computer-readable media of claim 18, wherein the standby mode of the compute device comprises a mode in which the compute device powers down at least a portion of the compute device.

25. The one or more non-transitory computer-readable media of claim 18, wherein the standby mode of the compute device comprises a mode in which at least a portion of a volatile memory of the compute device is powered down.

* * * * *